United States Patent [19]

Check et al.

[11] Patent Number: 4,809,021

[45] Date of Patent: Feb. 28, 1989

[54] APPARATUS AND METHOD FOR GENERATING IMAGES BY PRODUCING LIGHT SPOTS OF DIFFERENT SIZES

[75] Inventors: Frank T. Check, San Jose, Calif.; Ronald P. Sansone, Weston, Conn.

[73] Assignee: Pitney Bowes Inc., Stamford, Conn.

[21] Appl. No.: 144,704

[22] Filed: Jan. 12, 1988

Related U.S. Application Data

[60] Continuation of Ser. No. 472,559, Mar. 7, 1983, abandoned, Continuation-in-part of Ser. No. 391,029, Jun. 22, 1982, Pat. No. 4,386,272, which is a continuation of Ser. No. 240,532, Mar. 14, 1981, abandoned, which is a division of Ser. No. 130,278, Mar. 14, 1980, Pat. No. 4,310,757, which is a division of Ser. No. 922,596, Jul. 7, 1978, Pat. No. 4,214,157.

[51] Int. Cl.⁴ .................... G01D 9/42; G01D 15/18; G01D 15/10; B41J 3/00
[52] U.S. Cl. .................... 346/108; 346/1.1; 346/75; 346/76 PH; 400/118
[58] Field of Search .................... 101/426; 400/121; 346/75; 340/742; 178/30

[56] References Cited

U.S. PATENT DOCUMENTS

| | | | |
|---|---|---|---|
| 3,471,847 | 10/1969 | McCollough et al. | 340/742 |
| 3,884,148 | 5/1975 | Bergeron | 101/426 |
| 4,050,077 | 9/1977 | Yamada et al. | 346/75 |
| 4,052,719 | 10/1977 | Hutt et al. | 178/30 X |
| 4,281,333 | 7/1981 | Tsuzuki et al. | 346/75 X |

*Primary Examiner*—George H. Miller, Jr.
*Attorney, Agent, or Firm*—Peter Vrahotes; Melvin J. Scolnick; David E. Pitchenik

[57] ABSTRACT

An electro-optical light scanning system using a modulated laser illumination source directed upon a multifaceted rotating polygonal mirror or polygon. The mirrored facets reflect the impinging light toward a moving photoreceptor and forms a raster of scan lines as the photoreceptor moves to create dot images on the photoreceptor. The invention also encompasses amplitude modulation for varying the intensity of the laser illumination in conjunction with acousto-optical modulation for maintaining a constant level illumination and/or for varying dot size. Other embodiments describe producing dot size variation in an ink jet printer, a light emitting diode printer and a thermal printer.

11 Claims, 5 Drawing Sheets

APPARATUS AND METHOD FOR GENERATING IMAGES BY PRODUCING LIGHT SPOTS OF DIFFERENT SIZES

RELATED APPLICATIONS

This application is a continuation-in-part of application Ser. No. 391,029 filed June 22, 1982 which is a continuation of application Ser. No. 240,532, filed Mar. 4, 1981 (now abandoned), which is a division of Ser. No. 130,278, filed Mar. 14, 1980, now U.S. Pat. No. 4,310,757 which is a division of Ser. No. 922,596, filed July 7, 1978, now U.S. Pat. No. 4,215,157. This is a continuation of co-pending application Ser. No. 472,559, filed on Mar. 7, 1983.

BACKGROUND OF THE INVENTION

1. Field of the Invention

The invention pertains to dot matrix printers which print characters composed of dots and more particularly printers that are controlled electronically. Examples of such printers are those having a system for communicating information to a scanned medium which may utilize reflected light from a multifaceted rotating polygon or which may use a light emitting diode array to direct light to a photoreceptive surface. Other types of dot matrix printers include ink jet and thermal printers.

2. Description of the Prior Art

A recurring problem in dot matrix printing is to obtain refined characters, i.e., characters which give a good appearance. Various attempts have been made in the prior art to increase the quality of printing. For example, in U.S. Pat. No. 4,321,610, a matrix of overlapping dots is employed for the purpose of enhancing the quality of characters printed. This is defined in the patent as half space dot capability. In U.S. Pat. No. 4,149,071 means is provided to compensate for deterioration of modulation based on thermal effects on the light emitting elements so that a desired optical output waveform is obtained.

SUMMARY OF THE INVENTION

The present invention relates to dot matrix printers wherein the quality of printing is improved by varying the size of the dots in the matrix. The invention is particularly adaptable for electronic printers that receive information relative to text to be printed in the form of a binary coded signal and whose operations are controlled electronically. In one preferred embodiment of an electronic printer, a light source in the form of a laser beam is acousto-optically modulated in accordance with selected input data. The laser beam so modulated is directed toward a multi-faceted mirrored polygon driven at a constant angular velocity. As the successive mirrored facets of the polygon are illuminated, the light reflected generates a plurality of scan lines formed by successive dots which move across a moving photoreceptor and which are modulated to thus generate characters or a recorded likeness of an original test.

In order to obtain high quality printing, the light beam is modulated so that dots of different sizes are generated so as to obtain characters having the appearance of smoother edges. The preferable number of different sizes of dots is three. A larger number would further improve their appearance but at the cost of additional memory. Conversely less than three different sizes would decrease the quality of printing. By intermixing the three different sizes of dots along the edges of characters, one is able to close spacings that would normally be present when only one size dot is used.

BRIEF DESCRIPTION OF THE DRAWING

In the accompanying drawing.

Like numbers are used to designate like parts throughout the figures of the drawing.

DESCRIPTION OF THE PREFERRED EMBODIMENT

Figure 1:
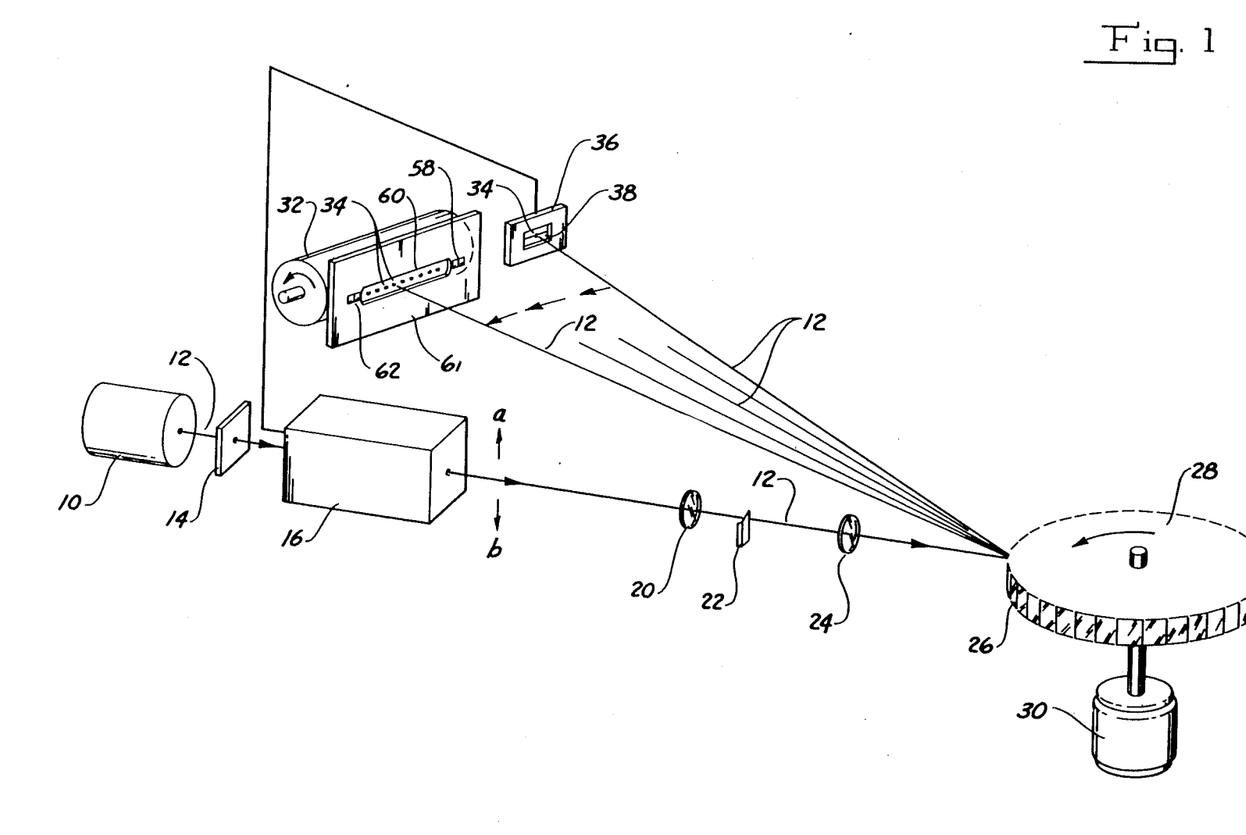
FIG. 1 is a diagrammatic representation of the major components of a laser beam scanning device that may be used to practice the present invention, the angle of reflection of the beam being distorted for purposes of illustration.

Referring now to the drawing, FIG. 1 illustrates an overall view of a laser beam scanning system practicing the present invention. The light source, such as a laser 10, which may be a 3 mw helium-neon laser, generates a collimates beam 12 of monochromatic light which is directed through a neutral density filter 14 to control the light intensity. The beam 12 then passes through a modulator 16, such as an acousto-optical modulator. The beam 12 is next directed through a first lends 20 and intercepted by a knife edge 22 placed at the focal point of the first lens 20. The knife edge 22 is employed for stopping the zero Bragg beam. The first order beam is thus separated and passes the knife edge 22 unattenuated. An example of a commercially available acousto-optic modulator is Model 1209 by Isomet Corp., Springfield, Va., which provides a built-in Bragg angle adjustment. The modulator 16 can typically be operated by a digital driver, such as Model No. 220 available from Isomet Corp. wherein transistor-transistor logic compatible digital input controls an RF switch for on-off gating of the modulator 16. Another acousto-optical modulator is Model 304 manufactured by Coherent Associated, Danbury, Conn.

It is desirable to use the first order beam to produce a spot because the position of the spot can be displaced in accordance with frequency modulation applied to the modulator which will selectively deflect the beam 12 in a desired direction such as indicated by the arrows a,b. The first order beam 12 is then directed toward a second lens 24 which directs a converging beam onto a reflecting face or facet 26 of a rotating polygonal mirror, herein referring to as a polygon 28. The polygon 28 is continuously or intermittently driven by a motor drive 30 and preferably is maintained at a constant velocity. In the preferred embodiment as shown, the polygon 28 has third facets 26 and is designed for generating approximately 240 scan lines per second. A moderate spot velocity is preferred for implementing the optical spot sensing and closed loop feedback correction circuitry.

The beam 12 is thus reflected successively from each of the facets 26 of the rotating polygon 28 and onto a photoreceptor 32. The reflection of the beam 12 from the polygon 28 is distorted for purposes of illustration as it will be appreciated that the incident beam and reflecting beam will be in the same plane rather than at an angle to one another as indicated by FIG. 1. The modulated beam 12 may appear as a succession of dots 34 which will generate a scan line forming a raster across the moving photoreceptor 32. The photoreceptor 32 may be any image plane and can be mounted on a rotating drum such as for use with an electrophotographic copier.

It should thus be apparent that the light scanning system of the present invention can be readily interfaced with an electrophotographic copier having panchromatic photoreceptors and can thus function as a high quality nonimpact printer.

It is well known that various types of errors are inherent in the geometric fidelity of a commercially available rotating polygon. In particular, deviation in parallelism of each facet relative to the axis of rotation introduces a facet-to-axis error and the resulting scan lines will correspondingly contain these inaccuracies which manifest themselves as alignment deviations from a desired scan line travel axis, i.e., line-to-line spacing variation. The present embodiment provides a spot correction assembly 36 having a split detector 38 for optically detecting and correcting for these facet-to-axis errors. Reference is made to U.S. Pat. No. 4,218,157 for a full description of correcting for such facet-to-axis error.

Scan line spot detection will now be discussed with reference to FIG. 1. Since the modulator 16 is controllable by internal logic which determines exposure on the scan format 32, an edge detector 58 is positioned adjacent the leading edge of an exposure slot 60 formed in an opaque shield 61 for indicating when the spot 34 is at the precise location. The edge detector 58 and a logic circuit can thus be used as an implement to synchronize the internal logic with the location of the scan line.

A second edge detector 62 of a similar construction to the edge detector 58 is located at a trailing edge of the exposure slot 60. The edge detector 62 will indicate when a beam 12 has passed a fixed terminal point beyond the scan path. The time differential as detected between the first edge detector 58 and the second detector 62 can be interpreted through logic circuitry to indicate the flight time for a beam 12 to cover a fixed length scan path. Thus, the speed of the beam 12 can be computed. Variations in speed for different scan lines can be detected, and a feedback loop can then be utilized for speed control of the motor drive 30.

It has been found that as a beam 12 is deflected or detuned from the Bragg angle, the efficiency will change. The scanning system of this invention, however, can be implemented by introducing an intensity modulator 64 for applying as amplitude modulated correction signal for maintaining laser illumination at a constant level. The intensity modulator 64 can be used for control of spot size by either varying the intensity or pulse width (time). Multiple exposure could also be used to vary the spot size i.e., allowing the photoreceptor 32 to remain stationary while a line scan is repeated so that selected ones of the dots produced will be impinged upon by the beam 12. The use of different spot sizes can effectively be employed as letters or numbers are created so as to avoid roughened edges and improve character formation. The system of this invention can also employ two power sources using parallel laser beams with each of the beams being of a different diameter and corresponding spot sizes. This will provide a matrix of dots on the photoreceptor 32 having different sizes for forming a single generated character. The different size dots will intermesh to create letters and numerals having a more refined appearance.

Figure 2:
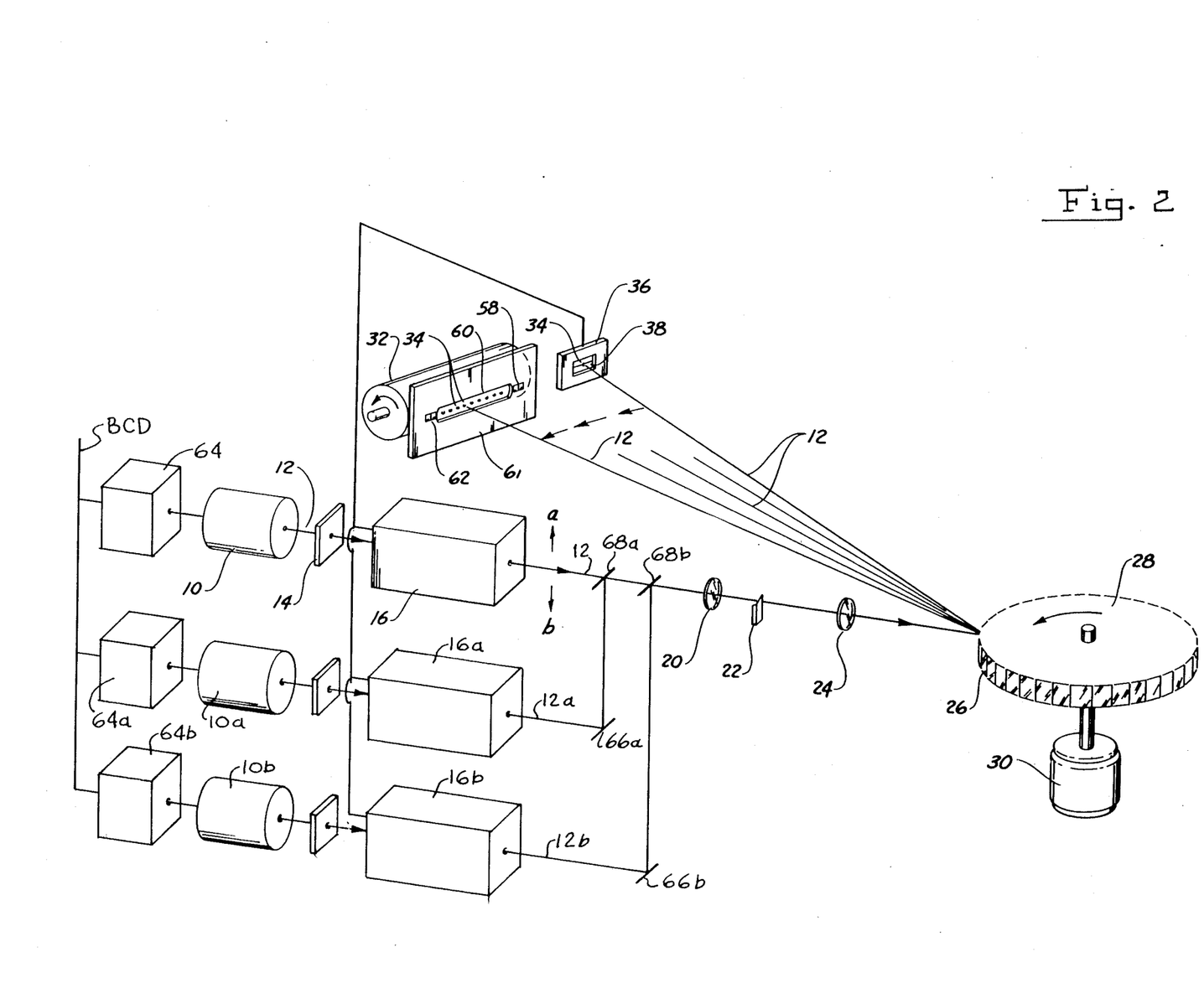
FIG. 2 is a representation similar to that shown in FIG. 1 but of an alternate embodiment of the invention.

The scanning system shown in FIG. 2 illustrates an embodiment wherein a plurality of beams, each beam having a different parameter, may be used to generate characters made up of dots of different sizes so as to produce smooth edges on the generated characters. The different parameter may be light intensity or pulse width. As seen in FIG. 2, an input in the form of a binary coded data (BCD) signal is supplied to three modulators 64, 64a and 64b which are electrically connected to three laser beams generators 10A, 10B, 10C, respectively. The light beams generated by these generators 10, 10a and 10b will each have a different intensity or pulse width so that when each beam alternatively strikes the photoreceptor 32, it will create a different size dot on such photoreceptor. The output from the lasers 10, 10a, 10b will be received by the acousto-optical modulators 16, 16a and 16b which through on-off gating create the beams 12, 12a and 12b that are directed to the polygon 28 which eventually form dots. Actually, the beams 12, 12a and 12b are directed to a common path by having a mirror 66a in the path of the beam 12a and a mirror 66b in the path of the beam 12b so that these two beams may be deflected to the path of the beam 12. Two beam splitters 68a and 68b are in the path of the beam 12. The beam splitter 68a allows the beam 12 to pass through while deflecting the beam 12a and beam splitter 68b will allow the beams 12, 12a to pass through and reflect the beam 12b. The combined beams 12, 12a and 12b will actually be conveyed at different times although they follow the same path from the beam splitter 68b to the polygon 28. These beams 12, 12a and 12b will be deflected toward the photoreceptor 32 so as to produce dots of different sizes thereon that combine to form characters as required by the BCD input.

Although the present invention has been described thus far with reference to printing using a laser beam or beams, it will be appreciated that the concept of using different size dots to produce dot matrix characters with smooth edges and improved character appearance is equally applicable to other types of dot matrix printers. An example of such other types of printers is an ink jet printer. In an ink jet printer, drops of ink are ejected from orifices in an ink head which is closely spaced from a record medium, such as a sheet of paper, on which characters are formed by combining a plurality of dots. Different dot sizes may be used to obtain characters with smooth edges. For example, in one technique for ink jet printing, ink is supplied at low pressure, usually of the order of several inches of water, to a capillary tube that terminates at an orifice. An impulse generator, such as a piezo-electric device, is used to cause a pressure pulse through the capillary tube to the orifice and thus eject a drop of ink. Usually a print head will contain any array of orifices, each being supplied with ink through a capillary tube and being its own impulse generator. Electrical control over the impulse generators allows the formation of characters on a record member by the formation of dots. By varying the electrical control, dots of different sizes may be used to create characters with refined edges.

Figure 3:
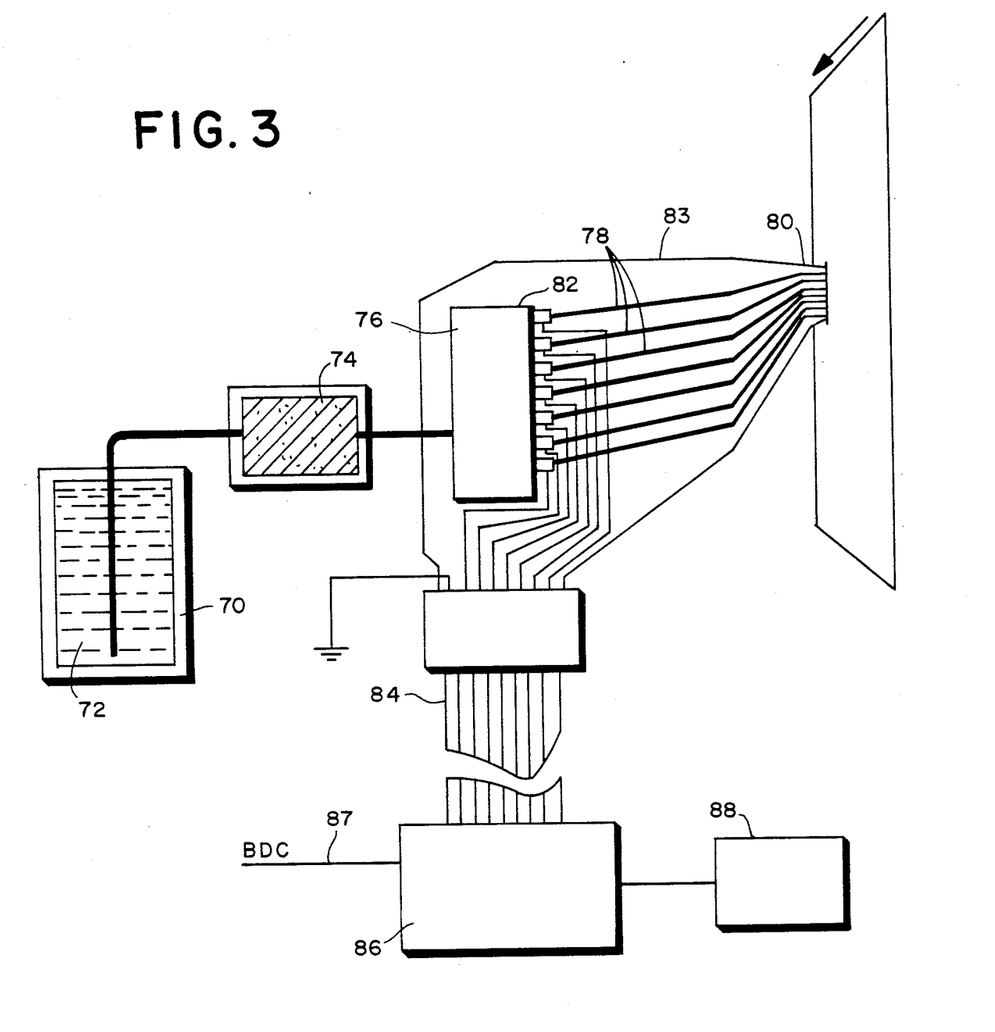
FIG. 3 is a diagrammatic view of an ink jet printing system in which the present invention may be utilized.

Such an ink jet printer is shown in FIG. 3. An ink cartridge 70 containing ink 72 therein is connected to an ink filter 74 which in turn is connected to an ink manifold 76. A plurality of generally vertically spaced capillary tubes 78 are confluent with the manifold 76 and have orifices, or nozzles, 80 at one end thereof which addresses a record member 81 and transducers 82, which may be piezoelectric devices, at the other end thereof. The manifold 76, capillary tubes 78, nozzles 80 and transducers 82 define a print head 83. A plurality of electrical leads 84 are connected to the transducers 82, there being one lead for each transducer 82 and a ground lead. The electrical leads are connected to a microcomputer 86 which in turn is connected to a look-up table 88 and a BCD input 87. With this arrangement, an input signal is received, as for example in the form of ASCII code. The microcomputer 86 will control the transducers 82 to eject drops of ink onto the record medium 81 in accordance with information stored in the look-up table 88 and the BCD input. More specifically, the input signal indicates the character to be printed and the look-up table indicates how the character is to be formed in terms of distribution of dots and the size of dots.

Figure 4A:
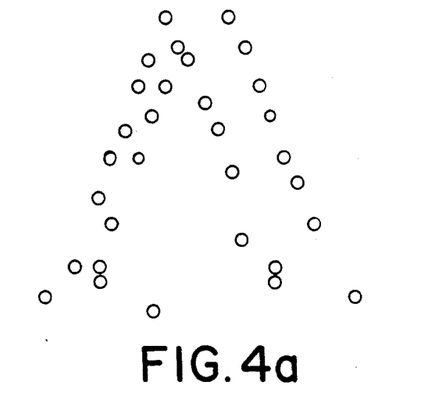
FIGS. 4a–4c are representations of maps of a look-up table.
Figure 4B:
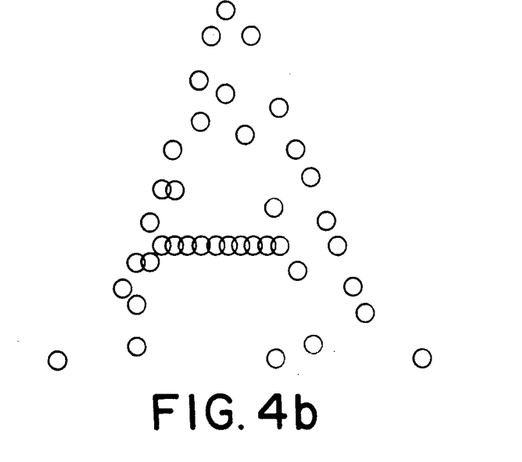
Figure 4C:
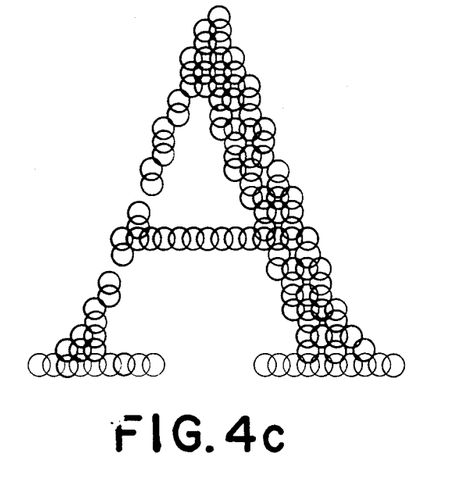
Figure 5:
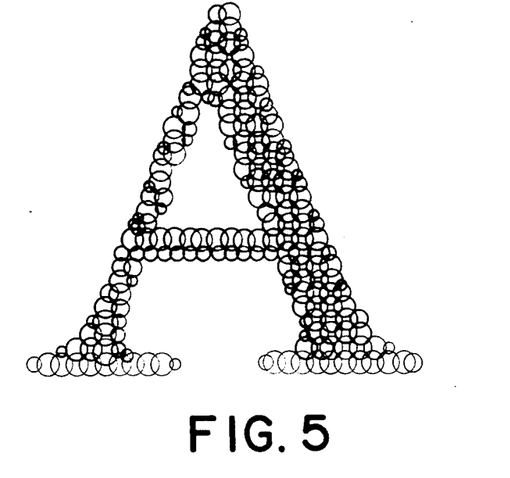
FIG. 5 is a representation of the letter "A" resulting from a composite of the maps of FIGS. 4a–4c.

Referring now to FIGS. 4a–4c and FIG. 5, the look-up table 88 is described and shown containing bit maps that are located at various addresses of the loop-up table. Each character to be printed has three bit maps containing information which when combined will form a character. The letter "A" is exemplified in FIGS. 4a–4c and FIG. 5. FIG. 4a represents a map containing locations for the small dots that are to be produced to make up the letter "A". FIG. 4b represents a map containing locations for the intermediate size dots and FIG. 4c is the same for the large size dots. FIG. 5 shows the results of combining the information of these three maps for producing a dot matrix pattern of different sizes to create the character "A". It will be observed that by using ink droplets of different sizes, a refined character having smoothed edges is produced. Obviously, this is repeated for all the characters to be printed. When the ASCII code supplied through the input 87 indicates that the letter "A" is to be produced, the microcomputer 86 will search the look-up table and supply signals to the leads 84 to produce ink drops of the required sizes. It will be appreciated that a parameter of the signals supplied to the transducers 82 will be varied so as to enable such transducers to cause different size ink droplets to be ejected from the orifice 80.

Figure 6:
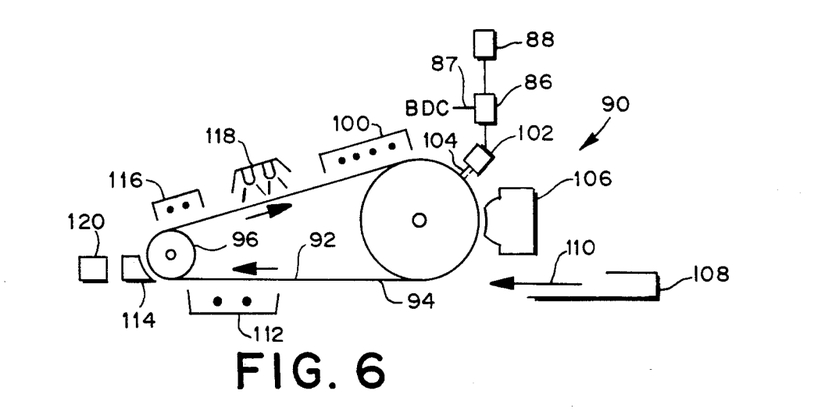
FIG. 6 is a diagrammatic representation of a xerographic printer using a light emitting diode print head which may utilize the present invention.

Referring to FIG. 6, a xerographic apparatus, or printer, is diagrammatically shown generally at 90 that is capable of utilizing the instant invention. The apparatus 90 includes an endless belt 92 that has a photoconductive surface 94 on the outer surface thereof. The belt 92 is trained about a roller 96 and a drum 98, either one of which may be driven for the purpose of rotating the photoconductive belt in a closed path. The photoconductive belt 92 would be of a generally known type comprising a substrate such as mylar with a first layer of thin aluminum and a second layer of photoconductive material 94 disposed on the outer surface thereof. Such photoconductive surface 94 may be zinc oxide, cadmium sulfide or an organic substance having photoconductive properties. As seen in FIG. 6, the photoconductive belt 92 would be rotated in a clockwise direction.

Addressing the photoconductive surface 94 of the belt 92 are a plurality of processing stations including a charge station 100, such as a charge corotron or scorotron, that applies a uniform charge to the photoconductive surface as it passes such station. Downstream from the charge station 100 is an imaging station or print head 102. This print head 102 preferably is of the type that selectively directs beams of light upon the photoconductive surface 94 which discharges small areas of the charged photoconductor to create an image representative of the text to be printed or reproduced. Such a print head 102 will have an array 104 of light emitting diodes (LED's) addressing the photoconductive surface 94 and will be connected to a microcomputer 86 which in turn is connected to a BCD input and look-up table 88. The print head 102 will operates in the same manner as described previously regarding the ink jet but the microcomputer 86 will control the enabling of the LED's of the array 104 rather than transducers feeding ink. Downstream from the print head 102 is a development station 106 that is preferably a magnetic brush unit. This magnetic brush unit 106 will be biased with a voltage of the same polarity as the charging station 100 but of a lower level and is operative to deposit toner particles on that portion of the photoconductor that has been discharged by the light emitted from the LED's of the array 104. A feed station 108 is located downstream from the development station 106 and conveys a sheet of paper 110 into contact with the photoconductive surface 94. A transfer station 112 is located downstream therefrom so that a sheet 110 will pass between the photoconductive surface 94 with the developed image thereon and the transfer station. The transfer station 112 is charged with a polarity opposite to that of the toner particles deposited on the photoconductive surface 94 by the development station 106 so as to cause the toner particles to be attracted thereto and be deposited on the sheet 110 to form the image thereon. Downstream from the transfer station 106 is a separating station 114 wherein the sheet 110 with the transferred image thereon is separated from the belt 92. No separating station may be required where the sheet 112 has sufficient stiffness so that it will not follow the belt 92 as it turns on the roller 96. Downstream from the transfer station 114 is a cleaning corotron 116 and a cleaning lamp 118. The sheet 110 with the image thereon will be conveyed to a fusing station 120 to fuse the toner particles theron and complete the print cycle. Downstream from the cleaning lamp 118 is the charge station 100 whereafter the cycle is repeated. With such a system, characters having smoothed edges may be produced using different dot sizes as described heretofore. Although the invention has been described relative to a xerographic engine employing a photoconductive surface, it will be appreciated that the same principles apply when using materials that have properties such that exposure to light will modify their physical, optical, chemical or electrical properties.

Figure 7:
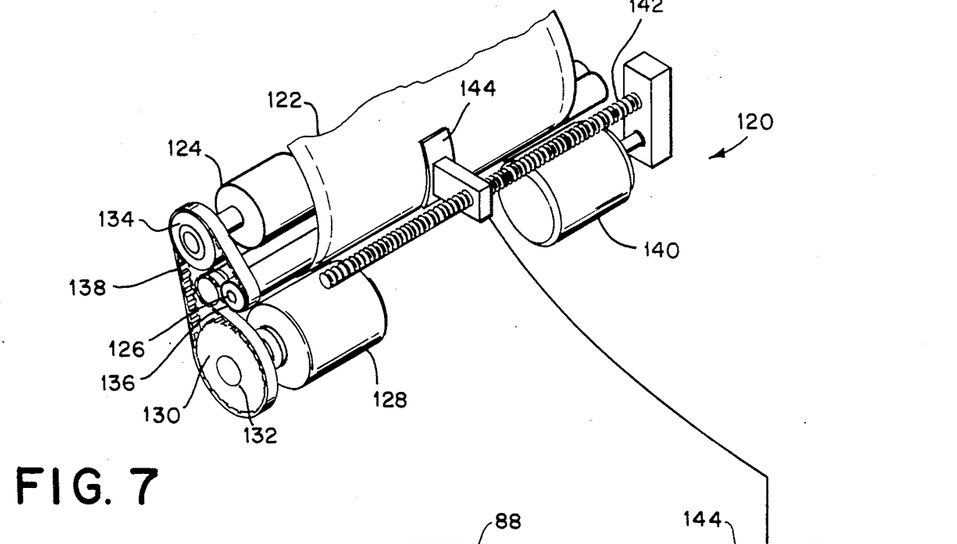
FIG. 7 is a perspective view of a thermal printer that may be used to practice the present invention.

Still, another type of printer in which the instant invention is readily adaptable is a thermal printer. In such a printer, electrical pulse currents are applied to heat-generating resistors that address thermally sensitive paper. As heat is generated by the resistors, heat of sufficiently high temperature is conducted in short thermal pulse to the thermally sensitive paper to produce darkened dots. Referring now to FIG. 7, a standard thermal printer is shown at 120 where thermally sensitive paper 122 is trained about a paper roller 124 and drive shaft 126. The thermal printer 120 has a pulse motor 128 with an output pulley 130 that is connected to its output shaft 132. A pulley 134 is connected to the paper roller and another pulley 136 is connected to the shaft 126. A timing belt 138 is trained about the motor pulley, paper roller pulley 132 and shaft pulley 136 for transferring drive from the pulse motor 128 to the paper 122. A second pulse motor 140 is drivingly connected to a rack 142 to which a thermal print head 144 is attached. The print head 144 will be incrementally driven across the thermal paper by actuation of the second pulse motor.

Figure 8:
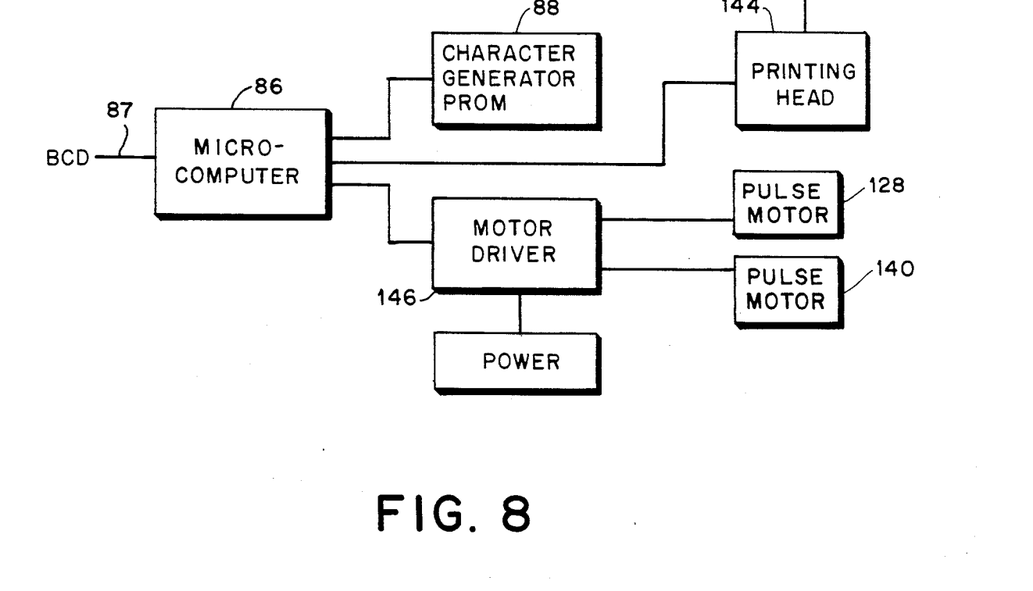
FIG. 8 is an electrical block diagram of the thermal printer shown in FIG. 7.

Referring now to FIG. 8, a block diagram is shown for a thermal printer of the type shown in FIG. 7. A BCD input 87 is connected to a microcomputer 86 which in turn is connected to a character generator 88, a portion of which incudes a look-up table. The microcomputer 86 is connected to the print head 144 to selectively enable the resistors thereof for generation of dots on the thermally sensitive paper 122. The microcomputer 86 is in electrical connection with a motor driver 146 that in turn is in electrical connection with the two pulse motors 128, 140. With such a thermal printer, characters with smooth edges may be formed by using dots of variable sizes as heretofor described in connection with other types of printers.

The instant invention has been shown and described with non-impact type printers but it will be appreciated that the same may apply equally to impact type printers wherein dot patterns representative of characters are generated to produce text. By way of example, in a dot matrix printer a computer having a BCD input and connected to a look-up table 8 may control the impact with which pins of a dot matrix strike a record member or sheet. The pins could be tapered so that the dot produced would be proportional to the amount of paper.

As various changes may be made in the systems as above set forth, it is to be understood that all matters herein described or shown in the accompanying drawing is to be interpreted as illustrative and not in the limiting sense.

We claim:

1. Apparatus for printing characters on a record medium in accordance with input data, comprising:
   an electronic printer having means for producing dot matrix patterns on a record medium and for intermeshing dots of at least three different sizes,
   a microprocessor connected to said electronic printer,
   a data input connected to said microprocessor, and
   a look-up table connected to said microprocessor that contains information of the characters to be printed on the record member by said printer in the form of different dot sizes, whereby characters with smoother edges may be produced by said electronic printer by intermeshing dots of at least three different sizes.

2. The apparatus of claim 1 wherein said electronic printer is a dot matrix printer.

3. Method of printing text characters on a record medium in accordance with input data, comprising:
   supplying an electronic printer having means for providing dot matrix patterns on a record medium,
   connecting a microprocessor to the electronic printer,
   connecting a data input to the microprocessor, and
   connecting to the microprocessor a look-up table containing information of various size dots required to produce characters with smooth edges, and creating a character with at least three different dot sizes intermeshed on the record medium to produce characters with smooth edges.

4. A method of dot matrix printing for printing characters on a record medium, comprising:
   supplying information relative to the characters to be printed,
   selecting at least three dot sizes,
   determining the dot sizes and required intermeshing of the dots that would result in characters having smooth edges, and
   generating a dot matrix in accordance with the determination and information supplied.

5. Apparatus for printing, comprising:
   means for producing dots of at least three different sizes on a record medium,
   means for controlling the location of said dots on said record medium to produce characters,
   means for supplying information of the characters to be printed to said producing means, and
   means for controlling the dot sizes and intermeshing of different dot sizes so as to produce characters with smooth edges.

6. The apparatus of claim 5 wherein said means for producing dots comprises means for creating ink dots on a sheet of paper.

7. A method of printing, the steps comprising:
   producing dots on a record medium,
   controlling the location of said dots on said record medium to produce characters,
   supplying information of the characters to be printed to said producing means, and
   controlling the dot sizes and dot locations to intermesh dots of at least three different sizes so as to produce characters with smooth edges.

8. The method of claim 7 wherein said step for producing dots comprises means for producing ink dots on a sheet of paper.

9. Apparatus for printing characters on a record medium in accordance with input data, comprising:
   an electronic printer having means for producing dot matrix patterns on a record medium,
   a microprocessor connected to said electronic printer,
   a data input connected to said microprocessor, and
   a look-up table connected to said microprocessor that contains maps of the characters to be printed on the record member by said printer wherein a character representation is composed of at least three maps having different dot sizes with dots of a single size on each map whereby maps for a given character when combined form a character with intermeshed dots and smooth edges.

10. The apparatus of claim 9 wherein said electronic printer is a dot matrix printer.

11. Method of printing text characters on a record medium in accordance with input data, comprising:
   supplying an electronic printer having means for providing dot matrix patterns on a record medium,
   connecting a microprocessor to the electronic printer,
   connecting a data input to the microprocessor, and
   connecting a look-up table containing maps of the characters to be printed to the microprocessor, creating a character by using at least three maps with dots of a different size on each map to from characters with intermeshed dots and smooth edges.

* * * * *

UNITED STATES PATENT AND TRADEMARK OFFICE
CERTIFICATE OF CORRECTION

PATENT NO. : 4,809,021
DATED : February 28, 1989
INVENTOR(S) : Frank T. Check et al.

It is certified that error appears in the above—identified patent and that said Letters Patent is hereby corrected as shown below:

Column 3, line 34, delete "4,218,157" and substitute therefor --4,214,157--.

Signed and Sealed this

Sixth Day of December, 1994

Attest:

BRUCE LEHMAN

Attesting Officer   Commissioner of Patents and Trademarks

UNITED STATES PATENT AND TRADEMARK OFFICE
CERTIFICATE OF CORRECTION

PATENT NO. : B1 4,809,021

DATED : September 27, 1994

INVENTOR(S) : Frank T. Check et al.

It is certified that error appears in the above-identified patent and that said Letters Patent is hereby corrected as shown below:

Cover page, [60] Related U.S. Application Data
should read:
-- Continuation of Ser. No. 472,559, Mar. 7, 1983, abandoned, which is a continuation-in-part of Ser. No. 292,985, Aug. 14, 1981, Pat. No. 4,455,562, and which is also a continuation-in-part of Ser. No. 391,029, Jun. 22, 1982, Pat. No. 4,386,272, which is a continuation of Ser. No. 240,532, Mar. 14, 1981, abandoned, which is a division of Ser. No. 130,278, Mar. 14, 1980, Pat. No. 4,310,757, which is a division of Ser. No. 922,596, Jul. 7, 1978, Pat. No. 4,214,157. --.

column 1, line 17, "*the*" should be deleted;

line 18, "*4,955,562.*" should be -- *4,455,562,* --.

column 2, line 1, "*This*" should be -- *and which* --;

line 2, after "1982," should be inserted -- *now U.S. Pat. No. 4.386,272,* --;

UNITED STATES PATENT AND TRADEMARK OFFICE
CERTIFICATE OF CORRECTION

PATENT NO. : B1 4,809,021  
DATED : September 27, 1994  
INVENTOR(S) : Frank T. Check et al.

Page 2 of 2

It is certified that error appears in the above-indentified patent and that said Letters Patent is hereby corrected as shown below:

Column 2,  
line 8, "4,215,157." should be -- [4,215,157] *4,214,157.* --.

Signed and Sealed this

Fourteenth Day of March, 1995

Attest:

BRUCE LEHMAN

*Attesting Officer*  *Commissioner of Patents and Trademarks*

REEXAMINATION CERTIFICATE (2404th)
United States Patent [19]
Check et al.

[11] B1 4,809,021
[45] Certificate Issued Sep. 27, 1994

[54] APPARATUS AND METHOD FOR GENERATING IMAGES BY PRODUCING LIGHT SPOTS OF DIFFERENT SIZES

[75] Inventors: Frank T. Check, San Jose, Calif.; Ronald P. Sansome, Weston, Conn.; Donald T. Dolan; Henry Stalzer, both of Danbury, Conn.

[73] Assignee: Pitney Bowes Inc., Stamford, Conn.

Reexamination Request:
No. 90/002,665, Mar. 18, 1992

Reexamination Certificate for:
Patent No.: 4,809,021
Issued: Feb. 28, 1989
Appl. No.: 144,704
Filed: Jan. 12, 1988

Related U.S. Application Data

[60] Continuation of Ser. No. 472,559, Mar. 7, 1983, abandoned, Continuation-in-part of Ser. No. 391,029, Jun. 22, 1982, Pat. No. 4,386,272, which is a continuation of Ser. No. 240,532, Mar. 14, 1981, abandoned, which is a division of Ser. No. 130,278, Mar. 14, 1980, Pat. No. 4,310,757, which is a division of Ser. No. 922,596, Jul. 7, 1978, Pat. No. 4,214,157.

[51] Int. Cl.$^5$ .................. G01D 9/42; G01D 15/10; B41J 2/205; B41J 3/00
[52] U.S. Cl. .................. 346/108; 347/15; 346/76 PH; 400/118
[58] Field of Search .................. 346/75, 1.1, 76 PH; 400/121

[56] References Cited

U.S. PATENT DOCUMENTS

| | | | |
|---|---|---|---|
| 3,471,847 | 10/1969 | McCollough et al. | 340/324 |
| 3,573,789 | 4/1971 | Sharp et al. | 340/324 |
| 3,884,148 | 5/1975 | Bergeron | 101/426 |
| 4,002,830 | 1/1977 | Brown et al. | 358/293 |
| 4,008,371 | 2/1977 | Barron | 358/206 |
| 4,034,408 | 7/1977 | Starkwesther | 358/293 |
| 4,050,077 | 9/1977 | Yamada et al. | 346/75 |
| 4,052,719 | 10/1977 | Hutt et al. | 340/324 AD |
| 4,281,333 | 7/1981 | Tsuzuki et al. | 346/140 R |
| 4,346,975 | 8/1982 | Isono | 354/195 |
| 4,455,562 | 6/1984 | Dolan et al. | 346/154 |

OTHER PUBLICATIONS

Print Quality Survey Confirms Detek Results; Pitney Bowes Tops Ratings Printout. vol. VI No. 10; Oct. 1982 pp. 1–3.

*Primary Examiner*—George H. Miller, Jr.

[57] ABSTRACT

An electro-optical light scanning system using a modulated laser illumination source directed upon a multifaceted rotating polygonal mirror or polygon. The mirrored faces reflect the impinging light toward a moving photoreceptor and forms a raster of scan lines as the photoreceptor moves to create dot images on the photoreceptor. The invention also encompasses amplitude modulation for varying the intensity of the laser illumination in conjunction with acousto-optical modulation for maintaining a constant level illumination and/or for varying dot size. Other embodiments describe producing dot size variation in an ink jet printer, a light emitting diode printer and a thermal printer.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

This application is *continuation of co-pending application Ser. No. 472,559, filed Mar. 7, 1983 (now abandoned), which is a continuation-in-part of the application Ser. No. 292,985, filed Aug. 14, 1981, now U.S. Pat. No. 4,955,562.*

*This is also* continuation-in-part of application Ser. No. 391,029, filed June 22, 1982, which is a continuation of application Ser. No. 240,532, filed Mar. 4, 1981 (now abandoned), which is a division of Ser. No. 130,278, filed Mar. 14, 1980, now U.S. Pat. No. 4,310,757 which is a division of Ser. No. 922,596, filed July 7, 1978, now U.S. Pat. No. 4,215,157. [This is a continuation of co-pending application Ser. No. 472,559, filed on Mar. 7, 1983.]

AS A RESULT OF REEXAMINATION, IT HAS BEEN DETERMINED THAT:

The patentability of claims 1-11 is confirmed.

* * * * *